United States Patent [19]
Green

[11] 3,716,826
[45] Feb. 13, 1973

[54] ACOUSTIC TO OPTICAL IMAGE CONVERTER

[75] Inventor: Philip S. Green, Redwood City, Calif.

[73] Assignee: American Express Investment Management Company, San Francisco, Calif.

[22] Filed: Feb. 2, 1970

[21] Appl. No.: 7,486

[52] U.S. Cl. .............................. 340/5 H, 73/67.5 H
[51] Int. Cl. ...................... G01n 29/00, H04b 11/00
[58] Field of Search ............ 340/1 R, 3 R, 5 H, 5 MP; 73/67.5 H; 181/0.5 R

[56] References Cited

UNITED STATES PATENTS

| | | | |
|---|---|---|---|
| 3,199,069 | 8/1965 | Lord et al. | 340/5 MP X |
| 3,594,717 | 7/1971 | Macovski | 340/5 H X |
| 3,050,725 | 8/1962 | Kuecken | 340/5 MP UX |
| 3,434,339 | 3/1969 | Stetson et al. | 340/5 X |
| 3,484,739 | 12/1969 | Cook | 340/5 H UX |

OTHER PUBLICATIONS

Gericke et al., Journal Acoustical Soc. Amer., pp. 872–880, Vol. 45, No. 4, April 1969

Primary Examiner—Richard A. Farley
Attorney—Townsend and Townsend

[57] ABSTRACT

A system for visualizing acoustic wave fields incident on an optically reflective, elastic surface. The elastic surface, upon which an acoustic image is impressed, forms the retroreflector for one of the orthogonal intersecting light beams of a Twyman-Green interferometer which illuminates the entire surface. The light beams are generated from a coherent light source and the reference beam is phase modulated or frequency offset with a light modulator. The recombined intersecting beams are scanned electronically with an image dissector thereby to generate an electrical analog signal including the image information superimposed on a temporal frequency carrier. Desired signal components are selectively filtered and displayed on an electronically addressable optical display.

7 Claims, 1 Drawing Figure

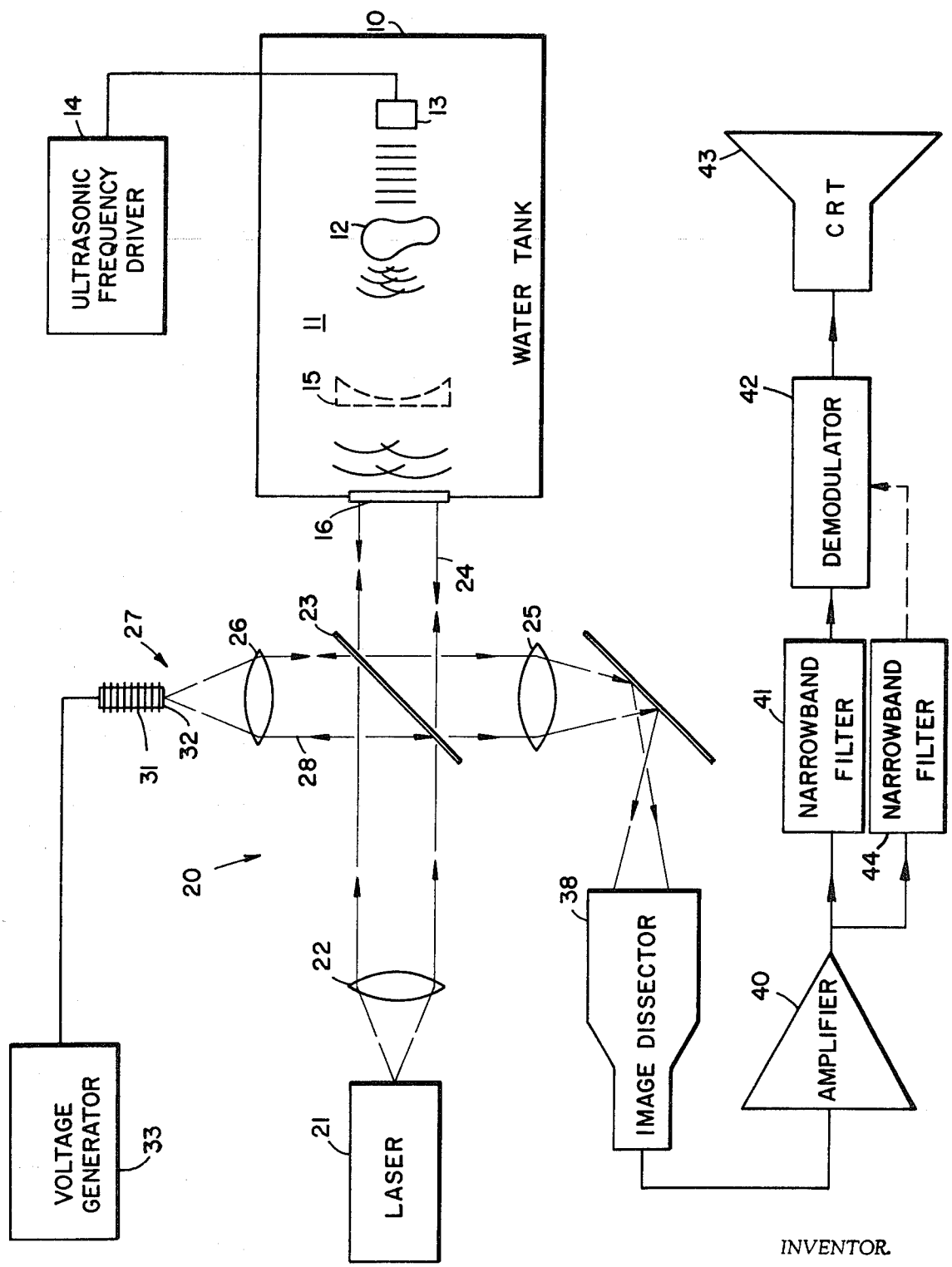
INVENTOR.
PHILIP S. GREEN
BY
*Townsend and Townsend*
ATTORNEYS

ACOUSTIC TO OPTICAL IMAGE CONVERTER

This invention relates to a new and improved system for converting an acoustic wave field to a corresponding light wave field to provide a visible image of an insonified object. The invention is useful for visualization of acoustic shadow images, acoustic focused images, and for formation of acoustic holograms and is applicable in such fields as non-destructive testing, medical diagnostics, underwater viewing and ultrasonic imaging generally.

In United States patent application Ser. No. 864,351 filed on Oct. 7, 1969, now U.S. Pat. No. 3,594,717 and entitled "Sonic Transducer", there is described a transducer for real time optical imaging of an ultrasonic wave field. According to that disclosure, an object is acoustically illuminated and the acoustic wave field or acoustic image originating from the insonified object impinges on an optically reflective, elastic surface. The acoustic wave field or image displayed on the elastic surface is converted to an optical image or visualized by means of a Mach-Zehnder type interferometer. In this arrangement, light from a coherent source is split into two beams at the corner of a rectangular path. One of the beams illuminates the entire elastic surface and is thereby phase modulated according to the pattern of ultrasonic perturbations displayed at the elastic surface, thereby to form an object light beam. The second beam travels along the opposite legs of the rectangular path and is modulated by a transmissive electro-optic modulator to form a reference beam. The modulated reference beam and object beam are combined to form a light interference pattern which in the case of acoustic holography contains the acoustic image amplitude and phase information, and, in addition, other undesired information related to random vibrations and undiffracted waves. The resulting interference pattern is scanned by an image dissector to generate electrical analog wave forms containing the desired image information and, in addition, frequencies representing undesired information. By means of appropriate electronic filtering the signal frequencies representing the desired image information are separated for display on an electronically addressable optical display such as a cathode ray tube.

A difficulty with the arrangement described in the above-referenced patent application is that the interfering light beams travel along paths of different lengths requiring special detection techniques to compensate for optical path length variations during scanning of the resultant light pattern. Thus, compensation in the form of temporal frequency shifts may be required during electronic scanning across the resultant interference pattern. Furthermore, the arrangement is generally limited to the use of a transmissive type optical modulator which results in further path length aberrations. If a reflective modulator is used in the optical path, a more complex lens system may be required.

It is therefore an object of the present invention to provide an improved sonic transducer for visualizing ultrasonic wave fields.

Another object of the invention is to provide a system for converting an acoustic wave field displayed at an elastic surface to a light wave field by interferometer means in which temporal phase shifts in the resultant light wave field produced by variations in the interferometer light paths are minimized.

A further object of the invention is to provide a simplified acoustic to optical image converter in which an interferometer is used to derive a light wave field containing the image information from an acoustic image and in which the image information in the light wave field is superimposed on a temporal frequency carrier by means of a reflective modulator in the reference light beam path of the interferometer.

In order to accomplish these results, the present invention contemplates providing means for insonifying an object to be reproduced and for impressing the resultant acoustic wave field originating from the object on a reflective elastic interface. According to the invention, the acoustic wave field impinging at the elastic interface is converted to a light wave field containing the image information by means of a Twyman-Green type interferometer. The interferometer is modified so that the elastic interface provides the retroreflector for, and is entirely illuminated by, one of the pair of orthogonal intersecting beams of light split from a coherent light source. The light beam incident on the vibrating elastic surface thereby provides an object beam.

According to another aspect of the invention, the other beam of the pair of orthogonal intersecting beams derived from the coherent light source is in effect frequency offset so that the complex interference wave field derived upon recombination of the intersecting beams is superimposed upon a temporal frequency carrier to facilitate subsequent filtering of desired optical image information from undesired optical information. The complex optical interference pattern is electronically scanned by an image dissector to produce an electrical analog signal having frequency components corresponding to both the desired image information, and undesired optical information produced by path aberrations and undiffracted light. Narrow band filters select the appropriate signal frequency components for display of the image on an electronically addressable optical display such as a cathode ray tube.

In another embodiment, the phase of the reference light-beam is caused to differ by 90° on two successive electronic scans by an image dissector of the superposed light fields. The sum of the intensities on two successive displays is a faithful analog of the acoustic field at the elastic surface.

A feature of the arrangement of the present invention is that the reference and object propagation paths are nearly symmetrical so that interference patterns introduced by accidental aberration in the path length difference of the interferometer beam paths are of low spatial frequency, facilitating later separation by filtering. An advantage of the arrangement of the present invention is that compensation may not be required for temporal frequency shifts produced due to electronic scanning across the interference field.

Another feature of the invention is that the system is applicable not only for visualizing two-dimensional acoustic shadow images and focused acoustic images, but also for three dimensional holography.

Other objects, features and advantages of the present invention will become apparent in the following specification and accompanying drawings.

Referring to the accompanying diagrammatic view of a system for converting acoustic wave fields to corresponding light wave fields, the object 12, an acoustic image of which is to be visualized, is immersed in an acoustically transmissive fluid 11 such as water retained within the tank 10. A transducer 13 provides an acoustic source for insonifying, i.e., irradiating with acoustic energy, the object 12. The resulting acoustic wave field originating from the insonified object 12 impinges on a solid silvered or otherwise reflective elastic surface or plate 16 of a material such as, for example, glass or plastic, which forms a portion of the boundary of the tank confining the liquid 11. The acoustic field incident on elastic surface 16 produces a pattern of time-varying perturbations or deformations across the surface representative of the acoustic field alternating at the acoustic frequency. This pattern is referred to herein as an "acoustic image" of the insonified object, "displayed" on the elastic surface 16. Ideally, the thickness of elastic surface 16 is an odd number multiple of the half wavelength of the acoustic frequency originating from source 13.

In the example shown in the figure, insonification of object 12 by source 13 is from behind the object so that the acoustic image displayed on surface 16 represents a transmissive wave field. The acoustic field transmitted through object 12 is diffracted by the object to produce an interference pattern or acoustic hologram containing amplitude and phase image information not only about the surface of the object but also about the internal characteristics of the object. For acoustic holography applications, sinusoidal or temporally coherent sonic or ultrasonic energy is preferably used. For two-dimensional acoustic shadow imaging, the object 12 would be placed adjacent the displayed surface 16 and either coherent or broad band sound can be used. For acoustic focused imaging, an acoustic lens 15 can be interposed in the acoustic wave path to produce a focused acoustic image on the elastic surface 16. For acoustic holography and acoustic focused imaging, insonification can also be accomplished from the side or the front of object 12 so that the acoustic image displayed on the elastic surface is a reflected acoustic wave field. Thus, insonification from the front or from a front angle produces back scatter waves for an acoustic hologram or an acoustic focused image representative of the reflective surfaces of the object.

In order to visualize the acoustic wave field displayed at the interface 16, i.e., in order to convert the acoustic wave field into an optical wave field, there is provided a Twyman-Green type interferometer 20, which provides two orthogonal intersecting light paths. Laser 21 provides a coherent light source for the interferometer, and the laser beam, collimated by lens 22, is split into two orthogonal beams of light by beamsplitter 23. The interferometer is arranged so that one of the split beams passes through beamsplitter 23 to be incident on the outer, reflective surface of plate 16 on which the acoustic field is displayed. The transmitted light beam 24 illuminates the entire surface 16 and is phase modulated by the oscillating perturbations induced at the interface by the acoustic waves to form an object beam. The object beam 24 reflected back from surface 16 is deflected by beamsplitter 23 to lens 25. At the same time, a portion of the coherent light from laser source 31 is deflected by beamsplitter 23 through lens 26 to a retroreflector 27 to form a reference beam. The reference beam reflected back from retroreflector 27 is transmitted through beamsplitter 23 to lens 25. The recombined object and reference beams are imaged by lens 25 onto the face of image dissector 30 to form a time varying interference pattern corresponding to the acoustic field displayed at surface 16.

The amplitude of the superposed wavefields incident on the image dissector ($x,y$ plane) may be expressed mathematically, using complex notation, as (1) $U(x,y) = \exp\{i\gamma(x,y)\} + \exp\{ikA(x,y)\sin[wt+\theta(x,y)] + i\beta(x,y)\}$, wherein $k = 2\pi/\lambda$, $\lambda$ is the wavelength of the light emitted by the laser 21, $A(x,y)$ and $\theta(x,y)$ are respectively the amplitude and phase of the acoustically-induced perturbations of the reflecting surface 16. Further, $w = 2\pi f$ where $f$ is the ultrasonic frequency and $\beta(x,y)$ represents undesired phase variations of the object beam resulting from unequal optical pathlengths. Such undesired variations are also presumed to be present in the reference phase function $\gamma(x,y)$. The electrical signal generated by the image dissector is proportional to the light intensity in the $xy$ plane, given by (2) $I(x,y) = |U(x,y)|^2$
$= 2 + 2\cos\{kA(x,y)\sin[wt+\theta(x,y)] + \beta(x,y) - \gamma(x,y)\}$.

Typically, the perturbations of the reflecting surface 16 will have amplitudes small as compared to a wavelength of light; that is, $kA(x,y) \ll 1$. Thus the intensity is well approximated by (3) $I(x,y) \cong 2 + 2\cos(\beta-\gamma) - 2kA\sin(wt+\theta)\sin(\beta-\gamma)$.

According to further aspects of the embodiment set forth in the accompanying figure, the reference beam 28 deflected by beamsplitter 23 is cyclically temporally offset by a modulator to form a modulated reference beam. In the example shown, the modulator consists of a piezoelectric crystal stack 31 having a retroreflector surface 32 affixed at the end stack. The piezoelectric crystal stack 31 is driven by a sawtooth voltage generator 33. The output of the generator 33 is a sawtooth wave having a substantially linear ramp and fast recovery which returns from a maximum to zero every $1/r$ seconds where $r$ is the repetition rate of the sawtooth wave. The amplitude of the sawtooth voltage is adjusted to cause the reflected reference light wave to suffer a total phase advance (or retardation) of $\eta 2\pi$ during each sawtooth cycle, where n is an integer. The resulting motion of the reflecting surface 32 results in a continuous, linear-with-time phase shift of the reference beam 28 resulting in an effective frequency modulation of the reference beam. As a result of the shift of the reference beam 28, the complex interference pattern derived upon recombination of the object and reference beams directed towards lens 25 is superimposed on a carrier and the entire pattern displayed on the face of image dissector 30.

Image dissector 30 scans the complex light pattern and generates an electrical analog signal having signal components corresponding to the desired image information obtained from the acoustic image and, in addition, other components corresponding to spurious vibrations and undiffracted waves. The resulting electrical signal is amplified by amplifier 40 and passed through narrow band filter circuitry 41 in order to extract the signal components corresponding to the desired image information. The filtered signal is thereafter demodulated in the demodulator 42 and displayed on an electronically addressable optical display such as cathode ray tube 43 which displays the desired pattern on the face of the tube. Such pattern may represent an acoustic shadow image, an acoustic focused image or an acoustic hologram depending upon the arrangement of elements in water tank 10.

This is described mathematically in the following manner: Owing to the modulation impressed on the reference beam, the reference-beam phase is represented by the function $$\gamma(x,y,t) = \gamma_0(x,y) + \Omega t,$$

where $\Omega$ is the frequency shift and $\gamma_0$ the undesired phase variation. Substituting this quantity into Equation 3 yields (4) $I(x,y) = 2 + 2 \cos(\beta - \gamma_0 - \Omega t) - 2Ak\sin(wt + \theta)\sin(\beta - \gamma_0 - \Omega t).$ To form an ultrasonic shadow or focused image, it is necessary only to recover the amplitude function $A(x,y)$. This may be accomplished with a narrowband electrical filter 41, having a center frequency of either $(w - \Omega)/2\pi$ or $(w + \Omega)/2\pi$. It is necessary that the reference offset frequency $\Omega$ be sufficiently high so that the two sidebands do not overlap. Owing to the symmetry of the optical system employed, the extraneous phase function $\beta(x,y) - \gamma_0(x,y)$ varies slowly with $x$ and $y$, therefore contributes little to the signal bandwidth. In order to form an acoustic hologram it is necessary to recover the entire perturbation function $A(x,y)\sin[\theta(x,y)]$. This may be accomplished by electrically separating and recovering the low-frequency signal $\cos(\beta - \gamma_0 - \Omega t)$ by means of the filter 44 and using it as a reference signal for the synchronous demodulation of the high-frequency, information-carrying component. In this case the demodulator 42 is a synchronous demodulator.

The image displayed in real time on the face of cathode ray tube 43 can be photographed to provide a photographic transparency. Alternatively, the filtered electrical signal can be displayed on an addressable screen or controllable transparency such as a scanned electro-optic plate to provide in real time an optical transparency of the insonified events transpiring in tank 10. In the case of acoustic holography photographic transparency or real-time transparency display can be illuminated with coherent light to reconstruct a three-dimensional image of events in tank 10.

In an alternate embodiment the output of the voltage generator 33 is a square wave of period T, where 1/T is the frame-scanning rate of the image dissector 38 and cathode ray tube 43. The amplitude of the square wave is set so as to produce an $m\pi/2$ radian phase displacement of the reflected reference light wave, where $m$ is an odd integer. Then, if the reference beam phase is caused to change at the beginning of each frame, it may be represented as in frame I $\gamma = \gamma_0(x,y)$
in frame II $\gamma = \gamma_0(x,y) + \pi/2$.

The electrical signal output of the image dissector, represented by Equation 3, is then filtered with a bandpass filter centered at $f = w/2\pi$, so that the signal amplitude as a function of $x$ and $y$ is:

for frame I $Ak \sin(wt + \theta) \sin(\beta - \gamma)$
for frame II $Ak \sin(wt + \theta) \cos(\beta - \gamma)$. If these signals are then squared, low-pass filtered, stored, for example, on a magnetic disc and then added together, the resulting signal is proportional to $A^2(x,y)$, and may be applied directly to the kinescope to form an image whose brightness is proportional to acoustic intensity. The square root of this signal may be used to form an image proportional to acoustic pressure.

Alternatively, the squared signals may be applied directly to the display. In the case of a cathode ray tube display, the phosphor persistence or the observer's eyes themselves can provide the necessary storage and summation obviating the magnetic disc or other storage means.

Instead of a reflective modulation, such as that provided by piezoelectric stack 31, the reference beam 28 can be modulated by a transmissive modulator such as an electro-optic crystal in the manner set forth in United States patent application Ser. No. 864,351, entitled "Sonic Transducer" referred to above. A more complete description of reference beam modulation, a mathematic description of the wave fields and signals thereby generated during visualization of the acoustic field, and filtering requirements, are further set forth in that patent application.

What is claimed is:

1. A system for converting an acoustic wave field to a light wave field comprising:
   a solid elastic reflective interface:
   means for displaying said acoustic wave field at the elastic reflective interface;
   interferometer means comprising a coherent light source, a single beam splitter for splitting the light from said coherent light source into two substantially symmetrical orthogonal intersecting object and reference beams of light, retroreflector means in the path of the reference beam, said elastic reflective interface forming retrofelector means in the path of said object light beam so that the object light beam entirely illuminates and is phase modulated by an acoustic image displayed at said interface.

2. A system for converting an acoustic wave field to a light wave field as set forth in claim 1 including modulating means comprising means cyclically varying the position of the retroreflector in said reference beam path thereby to phase modulate the reference light beam.

3. An acoustic to optical image converter comprising:
   means for insonifying an object to be reproduced, thereby to generate an acoustic wave field representative of the object;
   a reflective elastic surface positioned for displaying the acoustic wave field originating from said insonified object;
   interferometer means for visualizing the acoustic image displayed on said elastic surface comprising a coherent light source, means splitting the beam of coherent light from said source into two orthogonal intersecting object and reference beams of light, said elastic surface comprising first retroreflector means in the path of said object beam so that said surface is entirely illuminated by said object beam;

and second retroreflector means in the path of the reference beam, the second retroreflector means comprising piezoelectric means, a retroreflector surface connected to the piezoelectric means, and means for modulating the piezoelectric means to thereby modulate the surface and the reference beam and superimpose the complex light wave field derived by recombination of said object and reference beams on a carrier.

4. An acoustic to optical image converter comprising:

means for insonifying an object thereby to generate an acoustic wave field representative of the object;

an elastic surface positioned for displaying the acoustic wave field from said insonified object;

interferometer means for visualizing the acoustic image displayed on said elastic surface comprising a coherent light source, means splitting the beam of coherent light from said source into two substantially symmetrical orthogonal intersecting object and reference beams of light, first retroreflector means in the path of the reference beam, means for converging the reference beam on the first retroreflector, said elastic surface comprising a second retroreflector means in the path of said object beam;

means modulating the reference light beam of said interferometer means comprising piezoelectric means cyclically varying the position of the first retroreflector in said reference beam path;

means for scanning the intersecting object and reference beams to generate an electrical analog signal;

means for filtering and demodulating said electrical analog signal to extract signal components corresponding to desired image information;

and electronically addressable optical display means for displaying said filtered signal components.

5. An acoustic to optical image converter as set forth in claim 4 wherein said modulating means varies the position of the first retroreflector means in the path of said reference beam according to a square wave pattern to produce an $n\pi/2$ phase displacement of the reflected reference light wave at a rate equal to the frame scanning rate of said scanning means, where $n$ is an odd integer.

6. A system for converting an acoustic wave field into a corresponding light wave field comprising:

a solid reflective interface;

means for displaying said acoustic wave field at the elastic reflective interface;

Twyman-Green type interferometer means including a single beam splitter positioned so that said reflective interface forms a first retroreflector in one of two orthogonal light beam paths of said interferometer means;

a coherent light source for said interferometer means for generating two orthogonal light beams, the light source being arranged to entirely illuminate said reflective interface;

a second retroreflector having a reflecting surface in the other of said two orthogonal light beam paths of the Twyman-Green type interferometer; and means for cyclically varying the position of the reflecting surface to thereby modulate one of the two orthogonal light beams.

7. An acoustic to optical image converter comprising:

means for insonifying an object for generating an acoustic wave field representative of the object;

a solid surface positioned for displaying the acoustic wave field from the insonified object;

high efficiency interferometer means for visualizing the acoustic image displayed on the solid surface, the high efficiency means comprising a light source, a single beam splitter disposed between the light source and the solid surface for forming an object beam fully illuminating the solid surface and an orthogonal reference beam, piezoelectric means including a reflecting surface on the axis of the reference beam, means for modulating the piezoelectric means to thereby modulate the reflecting surface, and means converging the reference beam on the reflecting surface to thereby reduce the required area of the reflecting surface, whereby the reflected object beam and reference beam intersect and form a complex interference pattern;

means for scanning the interference pattern to generate a responsive electrical analog signal;

means for filtering and demodulating the electrical analog signal to extract signal components corresponding to desired image information; and means for displaying the filtered signal components.

* * * * *